US009444702B1

(12) United States Patent
Raponi et al.

(10) Patent No.: US 9,444,702 B1
(45) Date of Patent: Sep. 13, 2016

(54) SYSTEM AND METHOD FOR VISUALIZATION OF NOC PERFORMANCE BASED ON SIMULATION OUTPUT

(71) Applicant: NetSpeed Systems, San Jose, CA (US)

(72) Inventors: Pier Giorgio Raponi, San Jose, CA (US); Sailesh Kumar, San Jose, CA (US); Eric Norige, East Lansing, MI (US)

(73) Assignee: NETSPEED SYSTEMS, San Jose, CA (US)

( * ) Notice: Subject to any disclaimer, the term of this patent is extended or adjusted under 35 U.S.C. 154(b) by 0 days.

(21) Appl. No.: 14/616,337

(22) Filed: Feb. 6, 2015

(51) Int. Cl.
H04L 12/26 (2006.01)

(52) U.S. Cl.
CPC ......... H04L 43/045 (2013.01); H04L 43/0852 (2013.01); H04L 43/0888 (2013.01)

(58) Field of Classification Search
CPC ..... G06F 9/455; H04L 41/145; H04L 43/50; H04L 43/045; G01R 27/28
See application file for complete search history.

(56) References Cited

U.S. PATENT DOCUMENTS

| | | | |
|---|---|---|---|
| 4,409,838 A | 10/1983 | Schomberg | |
| 4,933,933 A | 6/1990 | Dally et al. | |
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,993 A * | 10/1996 | Sato et al. | 345/440 |
| 5,583,990 A | 12/1996 | Birrittella et al. | |
| 5,588,152 A | 12/1996 | Dapp et al. | |
| 5,764,740 A | 6/1998 | Holender | |
| 5,859,981 A | 1/1999 | Levin et al. | |
| 5,991,308 A | 11/1999 | Fuhrmann et al. | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |

(Continued)

FOREIGN PATENT DOCUMENTS

| | | |
|---|---|---|
| CN | 103684961 A | 3/2014 |
| KR | 10-2013-0033898 A1 | 4/2013 |

(Continued)

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

Primary Examiner — Curtis A Alia
(74) Attorney, Agent, or Firm — Procopio, Cory, Hargreaves & Savitch LLP

(57) ABSTRACT

Aspects of the present disclosure are directed to methods, systems, and non-transitory computer readable mediums for selective visualization and performance characterization of one or more transactions/messages or subsets of transaction/message of a System-on-Chip (SoC) and/or Network-on-Chip (NoC), with respect to latency, throughput, packet size, data size, hop-to-hop latency breakdown, load of one or more channels, power states of one or more elements of the NoC system, transaction data, among other like performance attributes.

17 Claims, 18 Drawing Sheets

(56) References Cited

U.S. PATENT DOCUMENTS

| | | | |
|---|---|---|---|
| 6,415,282 B1 | 7/2002 | Mukherjea et al. | |
| 6,557,147 B1* | 4/2003 | Lee .................. | G01R 31/31905 716/106 |
| 6,674,720 B1 | 1/2004 | Passint et al. | |
| 6,711,717 B2 | 3/2004 | Nystrom et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,590,959 B2 | 9/2009 | Tanaka | |
| 7,693,064 B2 | 4/2010 | Thubert et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,020,163 B2* | 9/2011 | Nollet .................. | G06F 15/7825 370/400 |
| 8,020,168 B2 | 9/2011 | Hoover et al. | |
| 8,050,256 B1 | 11/2011 | Bao et al. | |
| 8,059,551 B2 | 11/2011 | Milliken | |
| 8,099,757 B2 | 1/2012 | Riedl et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,448,102 B2 | 5/2013 | Kornachuk et al. | |
| 8,490,110 B2 | 7/2013 | Hoover et al. | |
| 8,492,886 B2 | 7/2013 | Or-Bach et al. | |
| 8,514,889 B2 | 8/2013 | Jayasimha et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2003/0088602 A1 | 5/2003 | Dutta et al. | |
| 2003/0145314 A1 | 7/2003 | Nguyen et al. | |
| 2004/0049565 A1 | 3/2004 | Keller et al. | |
| 2004/0216072 A1 | 10/2004 | Alpert et al. | |
| 2005/0147081 A1 | 7/2005 | Acharya et al. | |
| 2005/0203988 A1 | 9/2005 | Nollet et al. | |
| 2006/0031615 A1 | 2/2006 | Bruce et al. | |
| 2006/0075169 A1 | 4/2006 | Harris et al. | |
| 2006/0161875 A1 | 7/2006 | Rhee | |
| 2006/0206297 A1* | 9/2006 | Ishiyama .................. | 703/14 |
| 2006/0209846 A1 | 9/2006 | Clermidy et al. | |
| 2006/0268909 A1 | 11/2006 | Langevin et al. | |
| 2007/0038987 A1 | 2/2007 | Ohara et al. | |
| 2007/0088537 A1 | 4/2007 | Lertora et al. | |
| 2007/0118320 A1 | 5/2007 | Luo et al. | |
| 2007/0147379 A1 | 6/2007 | Lee et al. | |
| 2007/0162903 A1 | 7/2007 | Babb, II et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2007/0274331 A1 | 11/2007 | Locatelli et al. | |
| 2008/0072182 A1 | 3/2008 | He et al. | |
| 2008/0120129 A1 | 5/2008 | Seubert et al. | |
| 2008/0126569 A1 | 5/2008 | Rhim et al. | |
| 2008/0184259 A1 | 7/2008 | Lesartre et al. | |
| 2008/0186998 A1 | 8/2008 | Rijpkema | |
| 2008/0211538 A1 | 9/2008 | Lajolo et al. | |
| 2008/0232387 A1 | 9/2008 | Rijpkema et al. | |
| 2009/0037888 A1 | 2/2009 | Tatsuoka et al. | |
| 2009/0046727 A1 | 2/2009 | Towles | |
| 2009/0070726 A1 | 3/2009 | Mehrotra et al. | |
| 2009/0122703 A1 | 5/2009 | Gangwal et al. | |
| 2009/0172304 A1 | 7/2009 | Gueron et al. | |
| 2009/0187716 A1 | 7/2009 | Comparan et al. | |
| 2009/0210184 A1 | 8/2009 | Medardoni et al. | |
| 2009/0231348 A1 | 9/2009 | Mejdrich et al. | |
| 2009/0268677 A1 | 10/2009 | Chou et al. | |
| 2009/0285222 A1 | 11/2009 | Hoover et al. | |
| 2009/0300292 A1 | 12/2009 | Fang et al. | |
| 2009/0313592 A1* | 12/2009 | Murali et al. ..................... | 716/6 |
| 2010/0040162 A1 | 2/2010 | Suehiro | |
| 2010/0158005 A1 | 6/2010 | Mukhopadhyay et al. | |
| 2010/0211718 A1 | 8/2010 | Gratz et al. | |
| 2010/0223505 A1* | 9/2010 | Andreev et al. ................ | 714/37 |
| 2011/0022754 A1 | 1/2011 | Cidon et al. | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0085550 A1 | 4/2011 | Lecler et al. | |
| 2011/0103799 A1 | 5/2011 | Shacham et al. | |
| 2011/0154282 A1 | 6/2011 | Chang et al. | |
| 2011/0191774 A1 | 8/2011 | Hsu et al. | |
| 2011/0235531 A1 | 9/2011 | Vangal et al. | |
| 2011/0276937 A1 | 11/2011 | Waller | |
| 2011/0302345 A1 | 12/2011 | Boucard et al. | |
| 2011/0307734 A1 | 12/2011 | Boesen et al. | |
| 2011/0320854 A1 | 12/2011 | Elrabaa | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0079147 A1 | 3/2012 | Ishii et al. | |
| 2012/0099475 A1 | 4/2012 | Tokuoka | |
| 2012/0110106 A1 | 5/2012 | De Lescure et al. | |
| 2012/0110541 A1 | 5/2012 | Ge et al. | |
| 2012/0155250 A1 | 6/2012 | Carney et al. | |
| 2012/0173846 A1 | 7/2012 | Wang et al. | |
| 2012/0209944 A1 | 8/2012 | Mejdrich et al. | |
| 2013/0028090 A1 | 1/2013 | Yamaguchi et al. | |
| 2013/0028261 A1 | 1/2013 | Lee | |
| 2013/0051397 A1 | 2/2013 | Guo et al. | |
| 2013/0054811 A1 | 2/2013 | Harrand | |
| 2013/0080073 A1 | 3/2013 | de Corral | |
| 2013/0103369 A1 | 4/2013 | Huynh et al. | |
| 2013/0103912 A1 | 4/2013 | Jones et al. | |
| 2013/0117543 A1 | 5/2013 | Venkataramanan et al. | |
| 2013/0148506 A1 | 6/2013 | Lea | |
| 2013/0151215 A1 | 6/2013 | Mustapha | |
| 2013/0159944 A1 | 6/2013 | Uno et al. | |
| 2013/0163615 A1 | 6/2013 | Mangano et al. | |
| 2013/0174113 A1 | 7/2013 | Lecler et al. | |
| 2013/0179613 A1 | 7/2013 | Boucard et al. | |
| 2013/0191572 A1 | 7/2013 | Nooney et al. | |
| 2013/0207801 A1 | 8/2013 | Barnes | |
| 2013/0219148 A1 | 8/2013 | Chen et al. | |
| 2013/0250792 A1 | 9/2013 | Yoshida et al. | |
| 2013/0254488 A1 | 9/2013 | Kaxiras et al. | |
| 2013/0263068 A1 | 10/2013 | Cho et al. | |
| 2013/0268990 A1 | 10/2013 | Urzi et al. | |
| 2013/0326458 A1 | 12/2013 | Kazda et al. | |
| 2014/0068132 A1 | 3/2014 | Philip et al. | |
| 2014/0068134 A1 | 3/2014 | Sun | |

(56) References Cited

U.S. PATENT DOCUMENTS

| | | | |
|---|---|---|---|
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |

FOREIGN PATENT DOCUMENTS

| | | |
|---|---|---|
| WO | 2010074872 A1 | 7/2010 |
| WO | 2013063484 A1 | 5/2013 |
| WO | 2014059024 A1 | 4/2014 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA'11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

International Search Report and Written Opinion for PCT/US2014/037902, Sep. 30, 2014, 14 pgs.

International Search Report and Written Opinion for PCT/US2014/048190, Nov. 28, 2014, 11 pgs.

Hestness, J., et al., Netrace: Dependency-Tracking for Efficient Network-on-Chip Experimentation, The University of Texas at Austin, Dept. of Computer Science, May 2011, 20 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

International Search Report and Written Opinion for PCT/US2014/060745, Jan. 21, 2015, 10 pgs.

International Search Report and Written Opinion for PCT/US2014/060879, Jan. 21, 2015, 10 pgs.

International Search Report and Written Opinion for PCT/US2014/060892, Jan. 27, 2015, 10 pgs.

International Search Report and Written Opinion for PCT/US2014/060886, Jan. 26, 2015, 10 pgs.

* cited by examiner

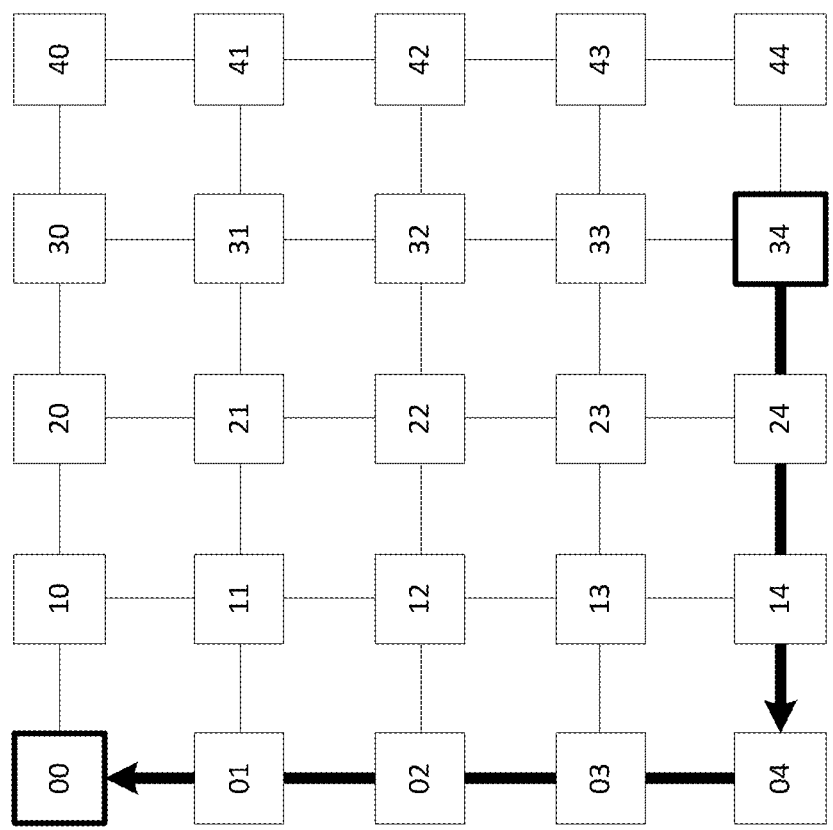

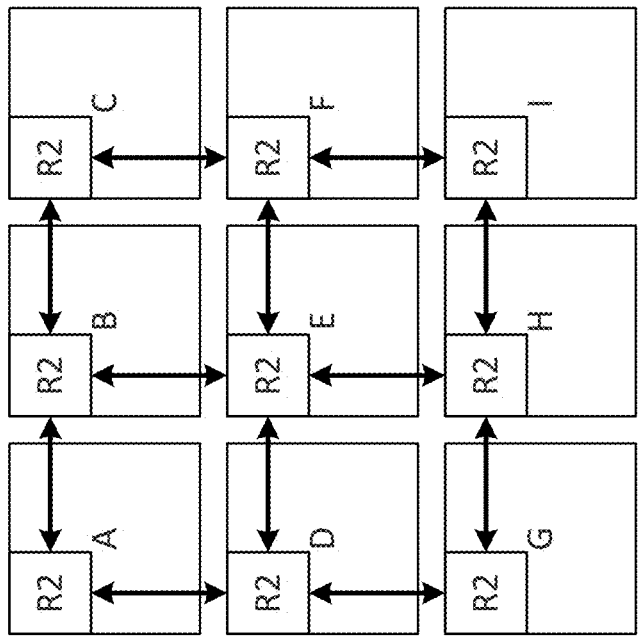
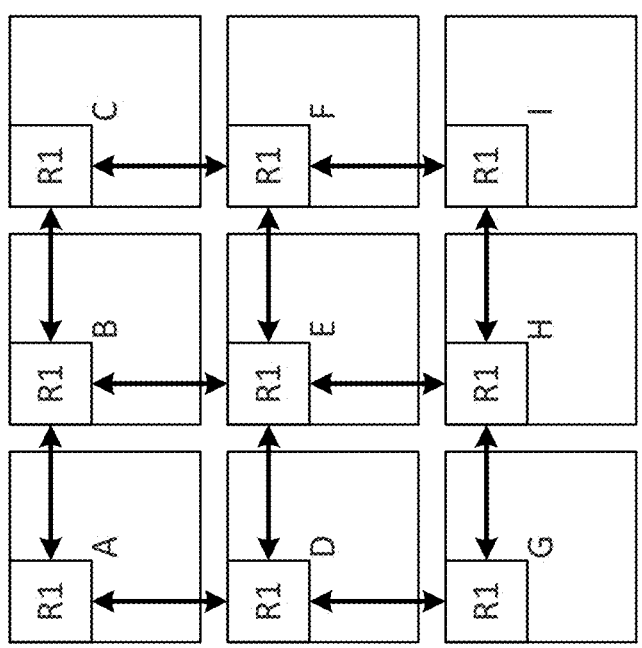
FIG. 3(a)

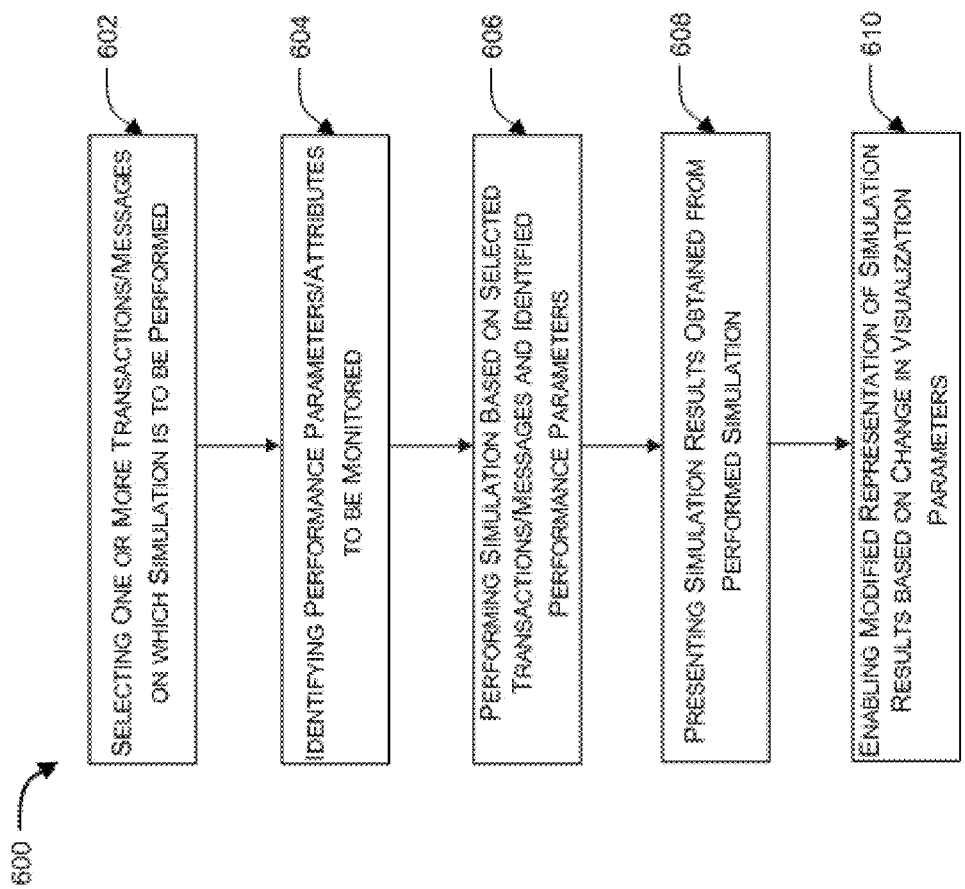

SYSTEM AND METHOD FOR VISUALIZATION OF NOC PERFORMANCE BASED ON SIMULATION OUTPUT

BACKGROUND

1. Technical Field

Methods and example implementations described herein are directed to an interconnect architecture, and more specifically to systems and methods for implementing visual and/or graphical representation of NoC performance based on outcome of simulation conducted on one or a combination of Network on Chip (NoC) interconnects and/or System on Chip (SoC) architectures.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links denoting connectivity and direction of data flow within the SoC and the NoC.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to one or more destination components. Components are connected to one or multiple ports of one or multiple routers; with each such port having a unique ID. Packets carry the destination's router and port ID for use by the intermediate routers to route the packet to the destination components.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. For example, shortest path routing may minimize the latency, as such routing reduces the number of hops from a source to one or more destination(s) and/or reduces the cost of routing a packet from the source to destination(s), wherein the cost of routing depends on bandwidth available between one or more intermediate elements/channels. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis until the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication, which thereby reduces the global average latency, as well as reduce the number of router nodes and links over which the higher bandwidth of this communication must be provisioned.

With the number of on-chip components growing, NoC and SoC being configured to support multiple traffic profiles/transactions/messages having different latency, throughput, and data size characteristics need to be simulated for their performance, and therefore visualization and/or graphical representation of the simulation output including comparison, merging, and conducting other such actions on one or more simulation results becomes necessary in order to evaluate the performance attributes of SoC agents, NoC elements, and/or the NoC channels that form part of the interconnect under varying traffic conditions. There is therefore a need in the art for methods, systems, and non-transitory mediums that can be can be configured for visualization and performance characterization of SoC and/or NoC for one and more transactions.

SUMMARY

Aspects of the present disclosure are directed to methods, systems, and non-transitory computer readable mediums for selective visualization and performance characterization of one or more transactions/messages or subsets of transactions/messages of a System-on-Chip (SoC) and/or Network-on-Chip (NoC), with respect to latency, throughput, packet size, data size, hop-to-hop latency breakdown, load of one or more channels, power states of one or more elements of the NoC system, transaction data, among other like performance attributes.

In an aspect, method of the present disclosure can include selecting one or more NoC transactions from a list of possible transactions that can be simulated using one or more filtering criteria in order to simulate the selected set of transactions. The method can further include the step of performing the simulation with respect to the selected set of NoC transactions, and presenting, based on a configured set of performance attributes such as throughput, latency, and data size, the simulation results using one or more visual displays, wherein the visual display(s) can be indicative of performance of the SoC/NoC or components thereof for at least one or more subsets of the selected transactions and/or messages that form part of the selected transactions, source and destination interfaces of the NoC, NoC agents, NoC channels, or a combination thereof including any other NoC element/component/agent that is intended to be simulated. In another aspect, the visualization of the simulation can either be generated and/or presented along with the simulation in real-time or can be generated once the simulation is complete. In another aspect, instead of one transaction, multiple transactions/messages can also be simulated together so as to display the simulation output separately, in a merged format, in a comparative format, or in any other format as desired and/or configured.

According to an aspect of present disclosure, visual display simulation results can be adjusted based on one or more visualization parameters such as bin size, bin interval, and a simulation time interval, wherein the bin size is indicative of a time period for aggregating the simulation results and bin interval is indicative of the time interval between consecutive aggregated simulation results. According to an example implementation, two or more visual displays relating to two and more different transactions or sub-sets of transactions can be merged to generate a merged visual display of simulation results. In another example implementation, visual display provides an expansion of an aggregated simulation result in another visual display in response to a selection of the aggregated simulation result in the visual display.

In another example implementation, two or more visual displays relating to same or different transactions or sub-sets of transactions can be generated using different performance and visualization parameters, wherein two or more different NoCs or subsets of a single NoC can be displayed side by side by, or in an overlapping manner to enable comparison of the performance of different transactions and/or different NoCs. In yet another example implementation, visual display of simulation results can be presented as a histogram, or as a table, or as a graph plot, or any other graphical representation format. In another aspect, visual display of simulation results can include one or more target metrics and/or performance metrics. In another aspect, selective simulation and/or performance characterization can include the step of selecting one or more transaction(s) or traffic profile(s) from a list of live and/or pre-stored transaction(s) or traffic profile(s) relating to NoCs/SoCs or subsets or regions of a single SoC/NoC.

In an example implementation, one and more transaction(s) or sub-set of transaction for selective visualization and characterization can be selected from a list of transactions or subsets of transaction, filtered by keywords, source or destination address, bin size, bin interval, transaction start time, transaction end time and other traffic parameters.

Aspect of present disclosure may include a computer readable storage medium storing instructions for executing a process. The instructions may involve selecting one or more NoC transactions from a list of possible transactions that can be simulated using one or more filtering criteria in order to simulate the selected set of transactions. The instructions can further involve performing the simulation with respect to the selected set of NoC transactions, and presenting the simulation results using one or more visual displays, wherein the visual display(s) can be indicative of performance of the SoC/NoC or components thereof for at least one or more subsets of the selected transactions, messages that form part of the selected transactions, source and destination interfaces of the NoC, NoC agents, NoC channels, or a combination thereof including any other NoC element/component/agent that is intended to be simulated.

Aspects of the present disclosure may include a system, which involves, a transaction selection module, a performance parameter selection module, a simulation module, a simulation output presentation module, and an simulation output management module. The transaction selection module can be configured to enable selection of one or more transactions or parts/messages thereof (from a list of available transactions) on which the simulation is to be performed. The performance parameter selection module can be configured to enable selection of one or more performance parameters such as throughput, latency, data size, bin size, bin interval, among others, with respect to which the performance simulation would be conducted. The simulation module can be configured to enable the simulation to be performed based on the selected transactions and performance parameters, wherein the simulation output presentation module can enable presentation of the simulation results/output in real-time or once simulation can be conducted. Simulation output management module, on the other hand, can be configured to enable one or more users to change the visual presentation layout of the simulation results by, for example, combining, merging, comparing, along with performing other allied actions such zoom/resize/change of bin interval/size, on the simulation outcomes.

BRIEF DESCRIPTION OF THE DRAWINGS

FIG. 2(a) illustrates an example of XY routing in a related art two dimensional mesh.

FIG. 3(a) illustrates an example of a related art two layer NoC interconnect.

FIG. 6 illustrates a flow diagram for visually presenting simulation results in accordance with an example implementation.

DETAILED DESCRIPTION

Figure 1A:
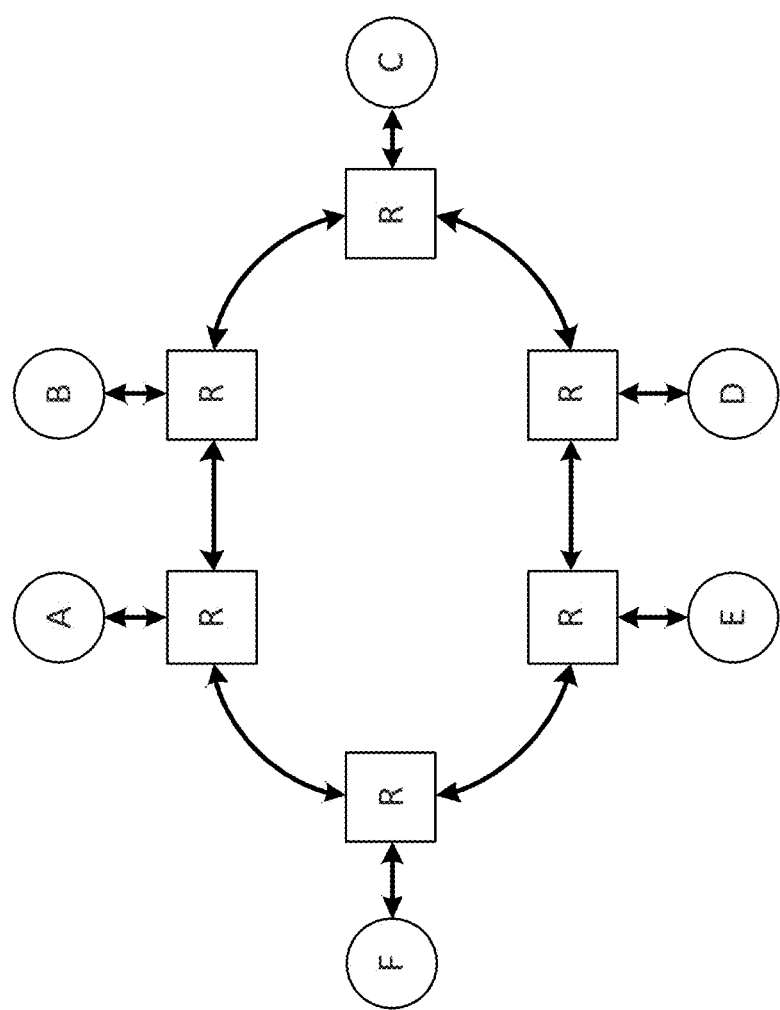
FIGS. 1(a), 1(b) 1(c) and 1(d) illustrate examples of Bidirectional ring, 2D Mesh, 2D Torus, and 3D Mesh NoC Topologies.
Figure 1B:
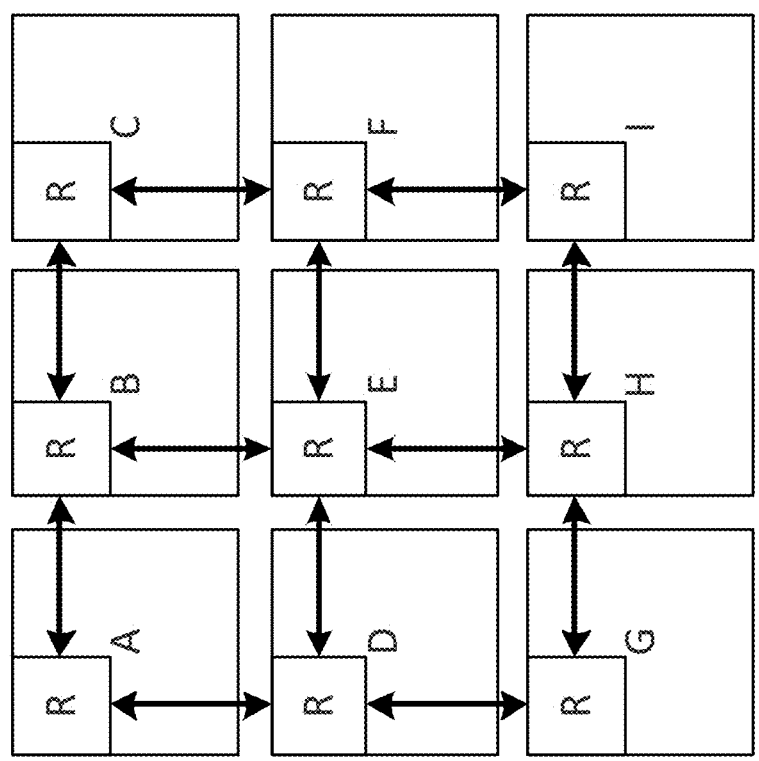
Figure 1C:
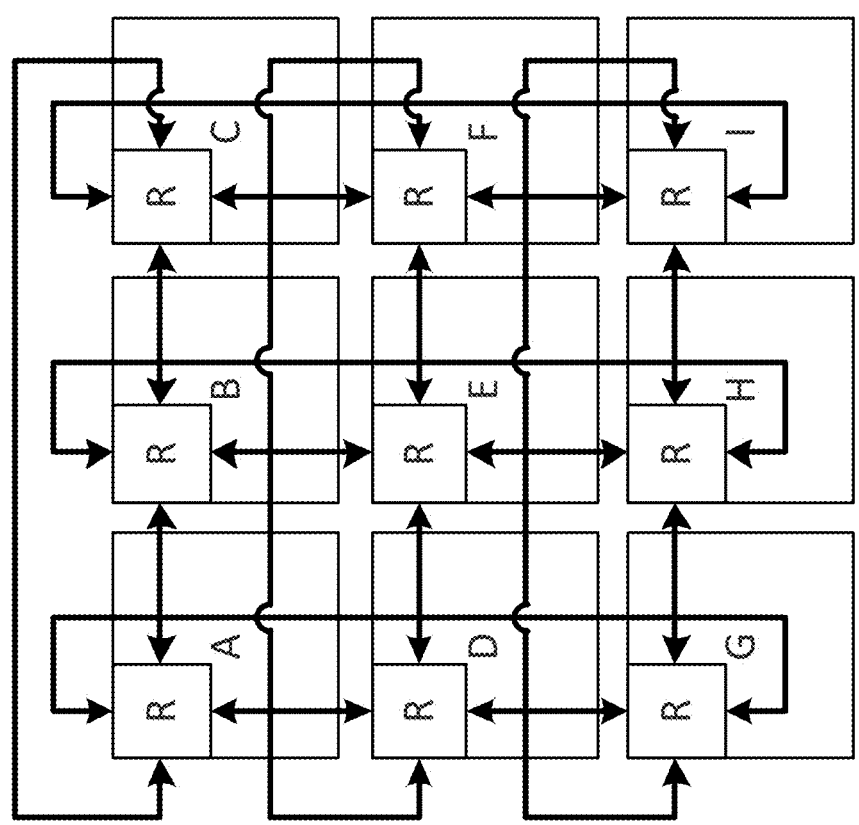
Figure 1D:
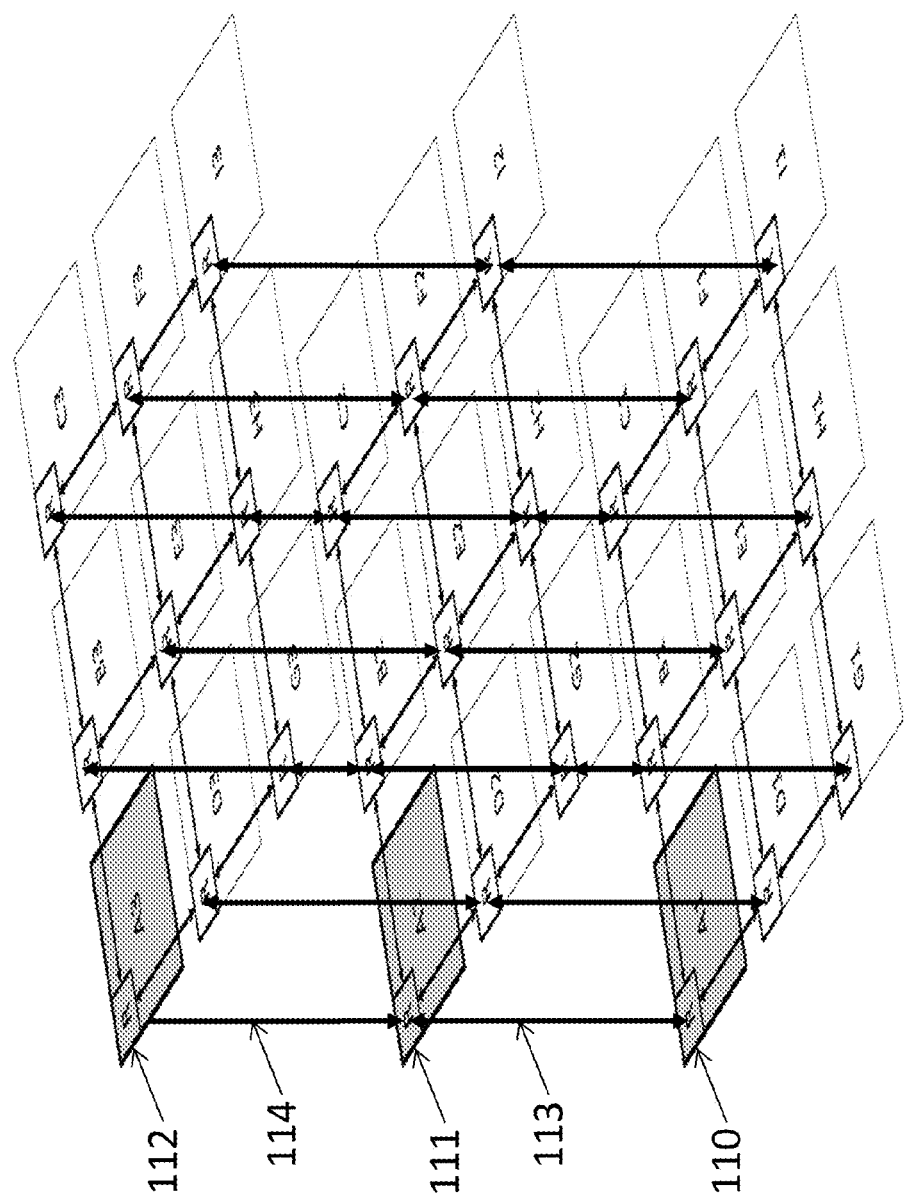
Figure 2B:
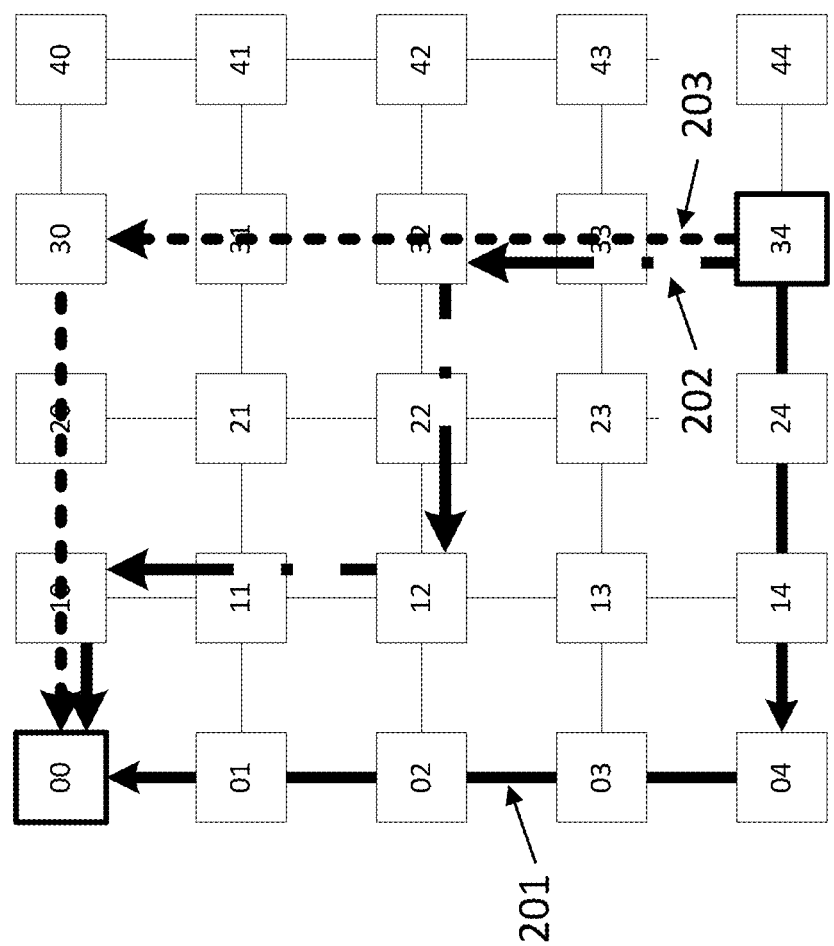
FIG. 2(b) illustrates three different routes between a source and destination nodes.
Figure 3B:
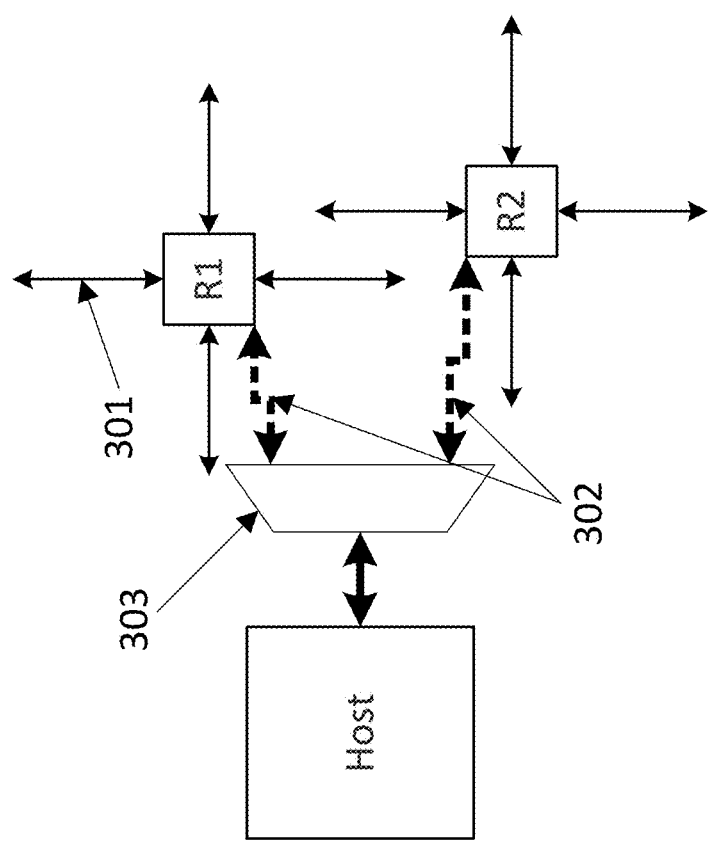
FIG. 3(b) illustrates the related art bridge logic between host and multiple NoC layers.

The following detailed description provides further details of the figures and example implementations of the present disclosure. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present disclosure.

Aspects of the present disclosure are directed to methods, systems, and non-transitory computer readable mediums for selective visualization and performance characterization of one or more transactions/messages or subsets of transaction/message of a System-on-Chip (SoC) and/or Network-on-Chip (NoC), with respect to latency, throughput, packet size, data size, hop-to-hop latency breakdown, load of one or more channels, power states of one or more elements of the NoC system, transaction data, among other like performance attributes.

In an aspect, method of the present disclosure can include selecting one or more NoC transactions from a list of possible transactions that can be simulated using one or more filtering criteria in order to simulate the selected set of transactions. The method can further include the step of performing simulation with respect to the selected set of NoC transactions, and presenting, based on a configured set of performance attributes such as throughput, latency, and data size, the simulation results using one or more visual displays, wherein the visual display(s) can be indicative of performance of the SoC/NoC or components thereof for at least one or more subsets of the selected transactions, messages that form part of selected transactions, source and destination interfaces of the NoC, NoC agents, NoC channels, or a combination thereof including any other NoC element/component/agent that is intended to be simulated. In another aspect, the visualization of the simulation can either be generated and/or presented along with the simulation in real-time or can be generated once the simulation is complete. In another aspect, instead of one transaction, multiple transactions/messages can also be simulated together so as to display the simulation output separately, in a merged format, in a comparative format, or in any other format as desired and/or configured.

According to an aspect of present disclosure, visual display simulation results can be adjusted based on one or more visualization parameters such as bin size, bin interval, and a simulation time interval, wherein the bin size is indicative of a time period for aggregating the simulation results and bin interval is indicative of the time interval between consecutive aggregated simulation results. According to an example implementation, two or more visual displays relating to two and more different transactions or sub-sets of transactions can be merged to generate a merged visual display of simulation results. In another example implementation, visual display provides an expansion of an aggregated simulation result in another visual display in response to a selection of the aggregated simulation result in the visual display.

In another example implementation, two or more visual displays relating to same or different transactions or sub-sets of transactions can be generated using different performance and visualization parameters, wherein two or more different NoCs or subsets of a single NoC can be displayed side by side by, or in an overlapping manner to enable comparison of the performance of different transactions and/or different NoCs. In yet another example implementation, visual display of simulation results can be presented as a histogram, or as a table, or as a graph plot, or in any other graphical representation format. In another aspect, visual display of simulation results can include one or more target metrics and/or performance metrics. In another aspect, selective simulation and/or performance characterization can include the step of selecting one or more transaction(s) or traffic profile(s) from a list of live and/or pre-stored transaction(s) or traffic profile(s) relating to NoCs/SoCs or subsets or regions of a single SoC/NoC. For example, the performance metrics can reflect the performance of a NoC/SoC for a given parameter (transactions, traffic flow, etc.), and can be overlaid with the target metric (e.g., desired transactions, traffic flow, constraints, etc.) for comparison.

In an example implementation, one or more transaction(s) or sub-set of transaction for selective visualization and characterization can be selected from a list of transactions or subsets of transaction, filtered by keywords, source or destination address, bin size, bin interval, transaction start time, transaction end time and other traffic parameters.

Aspect of present disclosure may include a computer readable storage medium storing instructions for executing a process. The instructions may involve selecting one or more NoC transactions from a list of possible transactions that can be simulated using one or more filtering criteria in order to simulate the selected set of transactions. The instructions can further involve performing the simulation with respect to selected set of NoC transactions, and presenting the simulation results using one or more visual displays, wherein the visual display(s) can be indicative of performance of the SoC/NoC or components thereof for at least one or more subsets of the selected transactions and/or messages that form part of the selected transactions, source and destination interfaces of the NoC, NoC agents, NoC channels, or a combination thereof including any other NoC element/component/agent that is intended to be simulated.

Aspects of the present disclosure may include a system, which involves, a transaction selection module, a performance parameter selection module, a simulation module, a simulation output presentation module, and a simulation output management module. The transaction selection module can be configured to enable selection of one or more transactions or parts/messages thereof (from a list of available transactions) on which the simulation is to be performed. The performance parameter selection module can be configured to enable selection of one or more performance parameters such as throughput, latency, data size, bin size, bin interval, among others, with respect to which the performance simulation would be conducted. The simulation module can be configured to enable the simulation to be performed based on the selected transactions and performance parameters, wherein the simulation output presentation module can enable presentation of the simulation results/output in real-time or once the simulation can be conducted. Simulation output management module, on the other hand, can be configured to enable one or more users to change the visual presentation layout of the simulation results by, for example, combining, merging, comparing, along with performing other allied actions such as zoom/resize/change of bin interval/size, on the simulation outcome.

Figure 4A:
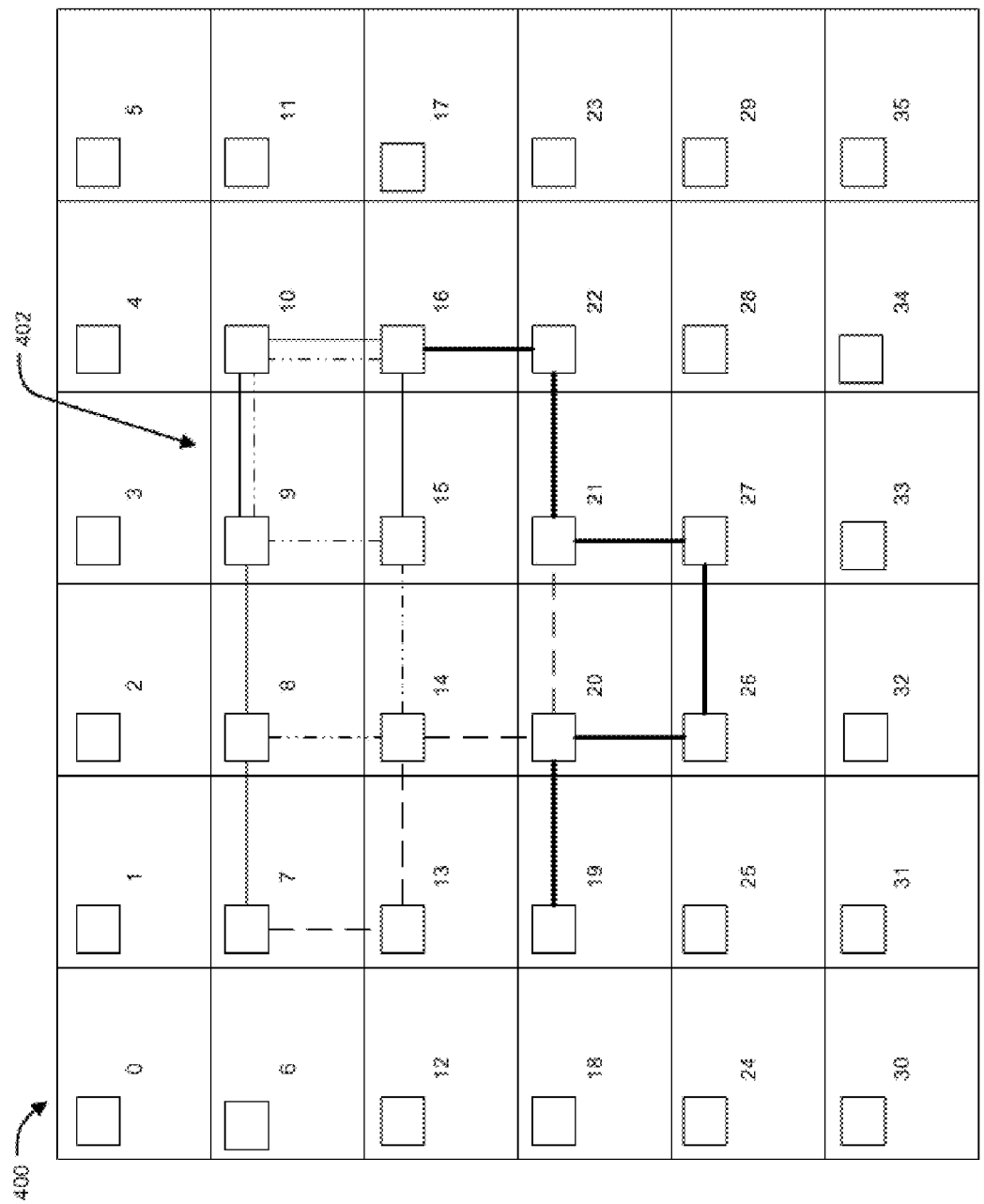
FIGS. 4(a) and 4(b) illustrate an example representation of a NoC for which selective visualization and/or performance characterization is to be performed in accordance with an example implementation.
Figure 4B:
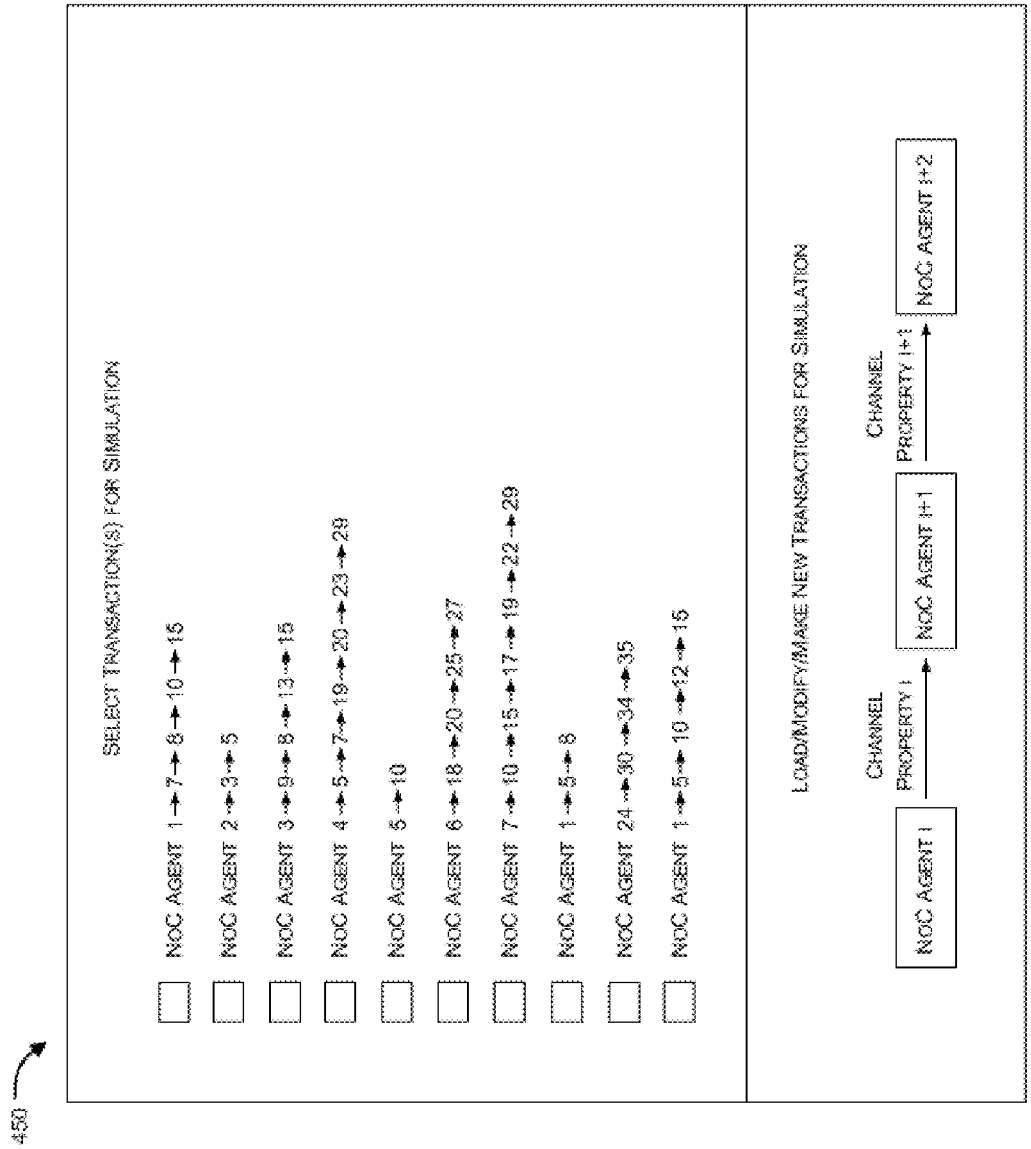

FIGS. 4(a) and 4(b) illustrate an example representation of a NoC interconnect on which selective visualization and/or performance characterization is to be performed in accordance with an example implementation of the present disclosure. FIG. 4(a) illustrates a single layer NoC interconnect 400 showing a plurality of NoC agents including, but not limited to, routers and bridges, ranging from 0-35 that are interconnected with each other by means of channels. Although the present disclosure is being explained with reference to a single layer NoC interconnect, the system of the present disclosure is applicable to multi-layer NoC architectures or parts thereof as well. In an aspect, FIG. 4(a) further illustrates how, from a given NoC interconnect 400, one or more transactions on which simulation is intended to be conducted, can be identified. Such selected set of transactions, in the example disclosure of FIG. 4(a) is shown through representation 402 of transactions, wherein each transaction being a sequence of defined number of NoC agents, and wherein multiple such transactions can be identified, which have been represented through multiple types of lines (dotted, bold, normal). Therefore, in an aspect of the present disclosure, multiple NoC components can be selected in a defined sequence to define a transaction, which can then be selected for conducting the simulation. In an aspect, instead of or apart from selection of the NoC components, channels and attributes thereof can also be configured in order to perform the simulation. Other attributes of NoC agents and/or channels or a combination thereof can therefore be configured in order to enable the simulation to take place on the defined configuration.

FIG. 4(b) shows another exemplary representation 450 which can facilitate a user to select one or more transactions from a defined set of previously configured/envisaged/performed transactions that can be listed and presented by a user interface in accordance with a desired implementation. Representation 450 can further enable a user to initially select a transaction from a list of given transactions, and then modify/amend the transaction as desired. The implementations shown through FIGS. 4(a) and 4(b) are completely exemplary in nature and any other methods to facilitate selection/definition of a desired set of transactions on which simulation is to be performed are also within the scope of the present disclosure.

According to one implementation, once the desired set of transactions is selected; the results can be shown in a defined/configurable presentation/visualization format. The simulation results/outcome can either be represented dynamically at run-time while the simulation is going on, or can be presented in a single-go when the simulation run is complete or has reached a defined stage(s). In another implementation, such presentation attributes can always be amended and configured as desired by the user, wherein, for instance, the presentation can, by default, for each transaction or part/message thereof, represent all performance parameters including but not limited to throughput, latency, data size, or can be customized only to show a defined number of performance parameters/attributes.

In an aspect, one graph can be generated per transaction and/or part/message thereof. Although the present disclosure is being explained with reference to a transaction, the visualization can also be conducted for one or a combination of messages that form part of the transaction or also on a defined configuration of channel(s)/agents, and therefore each use of the term "transaction" can be interpreted to be equivalent to message/channel/NoC agent. Furthermore, in another implementation, instead of representing all the performance attributes for a given transaction in a single graph, independent graphs can be made for each transaction for each of the desired performance parameter/attribute.

According to another implementation, simulation graphs can be modified at run-time and/or when the same is presented to the user, wherein such modification can include, but is not limited to, resizing the graph, zooming into specific portions of the graph, modifying the bin size, and/or the bin interval. One or more graphs for one or a set of transactions can also be merged, wherein, for instance, two graphs for two different transactions showing different or same set of common parameters can be merged together to enable comparison of the performance parameters of the transactions. Furthermore, simulation run for a given transaction conducted over a period of time can be integrated and presented to the user on a single or a plurality of graphs/visual representations.

In an aspect of the present disclosure, simulation can be conducted on a defined number of NoC agents/channels to assess the behavior of the NoC interconnect with respect to the complete or a part of the system based on collection of performance statistics through attributes such as throughput, latency, data size, per hop latency, start time, end time, among others. Instead of agents, performance can also be evaluated at message level, wherein each transaction includes a plurality of messages, and the simulation can be conducted to evaluate the relationships between messages and transactions. While selecting a transaction that is to be simulated, parameters such as the size of the transaction, the NoC agents that would form part of the transaction, the virtual channels that would form part of the transaction, messages that form part of the transaction, and various other parameters can also be considered and also defined according to the desired implementation. Simulation can also be conducted on a subset of traffic transactions of the NoC. In another aspect, the transaction rate and/or data size of one or more transactions can also be configured and/or scaled (up or down) during the simulation. In yet another aspect, the simulation can be run at different agents and/or NoC elements and at different/varying clock frequencies. Power state of the NoC system can also be configured at agent/channel/system level to view the impact of such a change on the performance attributes/parameters.

According to one implementation, the simulation results can be stored in a file, and retrieved at a later stage for comparative purposes. The representation can include any known representation format including but not limited to a plot, histogram, table, pie charts, bar graphs, among other known and conceivable formats, or a combination thereof. As mentioned above, a given graph can be presented for a single transaction per set, or for a single message per set, or for a single source interface per set, or for a single destination interface per set, or per NoC agent, or for a single channel per set, or any other NoC interconnect element of whose performance is to be evaluated. Any other NoC agent/channel/message can be represented individually or collectively in the manner deemed fit. Once generated, the graph can also be modified/customized to generate further graphs through actions such as merging of graphs, change in presentation format (pie to bar graph or vice versa), use of one or more filters/criteria/thresholds, among other known methods. According to one implementation, performance attribute/parameter/metric of data size can include presentation of packet size, overhead, data per message, data per transaction, or any other performance-impacting attribute that is useful for assessing the behavior of the selected portion of the NoC interconnect. In another example implementation, simulation results can be filtered based on an input (e.g., user input, file input, etc.) which is associated with a specified rule (e.g., display within specified range, analyze only certain transactions, etc.), and example implementations can adjust the visual display of simulation results based on the filtered simulation results According to one implementation, presentation of simulation output (e.g., through a graph) can be zoomed into in order to analyze specific performance parameters with respect to time, and also view additional attributes. Such zooming can either be conducted directly on the graph, or by changing the viewing time, bin interval, bin size, start/end timeframes, or a combination thereof. Each bin interval can be represented through a data point in the plot, wherein bin interval is a collection of one or more simulation captured events. From a bin interval, it is possible to retrieve the associated simulation events in the corresponding bin size. Bin size, on the other hand, can represent dimension of a single bin interval, for instance, the amount of time in which all simulation events are collected.

According to one implementation, two or more homogeneous graphs from the same or different simulation runs can be compared by overlapping each other in a graph. Similarly, two or more simulation runs can be compared by merging two or more data sets into a single visualization tab. In another implementation, two or more NoC designs can be simulated and compared by loading two or more data sets into a single NoC design. Data points can be managed by executing the complete simulation and storing the simulation results to enable users to later prepare and post queries to get access to only the relevant/desired simulation data. Simulation data can also be in any repository and any desired file format and later loaded whenever desired. Data can also be edited and/or modified so as to load only a portion of the simulation output. In an example implementation, major pointers (such as max value, min value, avg. value) from the simulation output can also be automatically evaluated by the proposed system in order to present relevant information such as congestion areas, channels causing the congestion, non-performing NoC agents, along with highlighting other areas of user's interest. The system of the present disclosure can have the ability of selecting a sub-region of each graph interactively to show more detailed statistics of the region under investigation.

According to another implementation, simulation of one or more transactions/messages can be conducted in order to evaluate the load/occupancy, throughput, number of times VC is blocked, inter-agent latency, data size, % of congestion, average transmission time between each node, among other like/desired information, on the NoC agents/channels involved in the transaction. As also mentioned above, instead of retrieving information on the complete transaction, simulation output from any subset of traffic can also be extracted, for example, only for load traffic, or store traffic, or high priority traffic. Based on simulation output, multiple other configured graphs can also be automatically made, wherein, for instance, based on the congestion data received after the simulation, congested VCs can be presented in a separate graph with respect to time. The representation can also be made in different colors/fonts/shapes/sizes depending on the attribute to be presented and the configuration defined thereof.

FIGS. 5(a) to 5(f) illustrate example simulation results presentation options/graphs in accordance with an example implementation. The representations of FIGS. 5(a) to 5(f) are completely exemplary in nature, and any other change in representation/user interface (UI) is completely within the scope of the present disclosure. The figures illustrate examples of performance visualization of a NoC for any desired sets or subsets of source/destination interfaces, traffic flows, messages or transactions. Depending on the desired implementation, the sets or subsets can be displayed in a list form alongside the performance visualization.

Figure 5A:
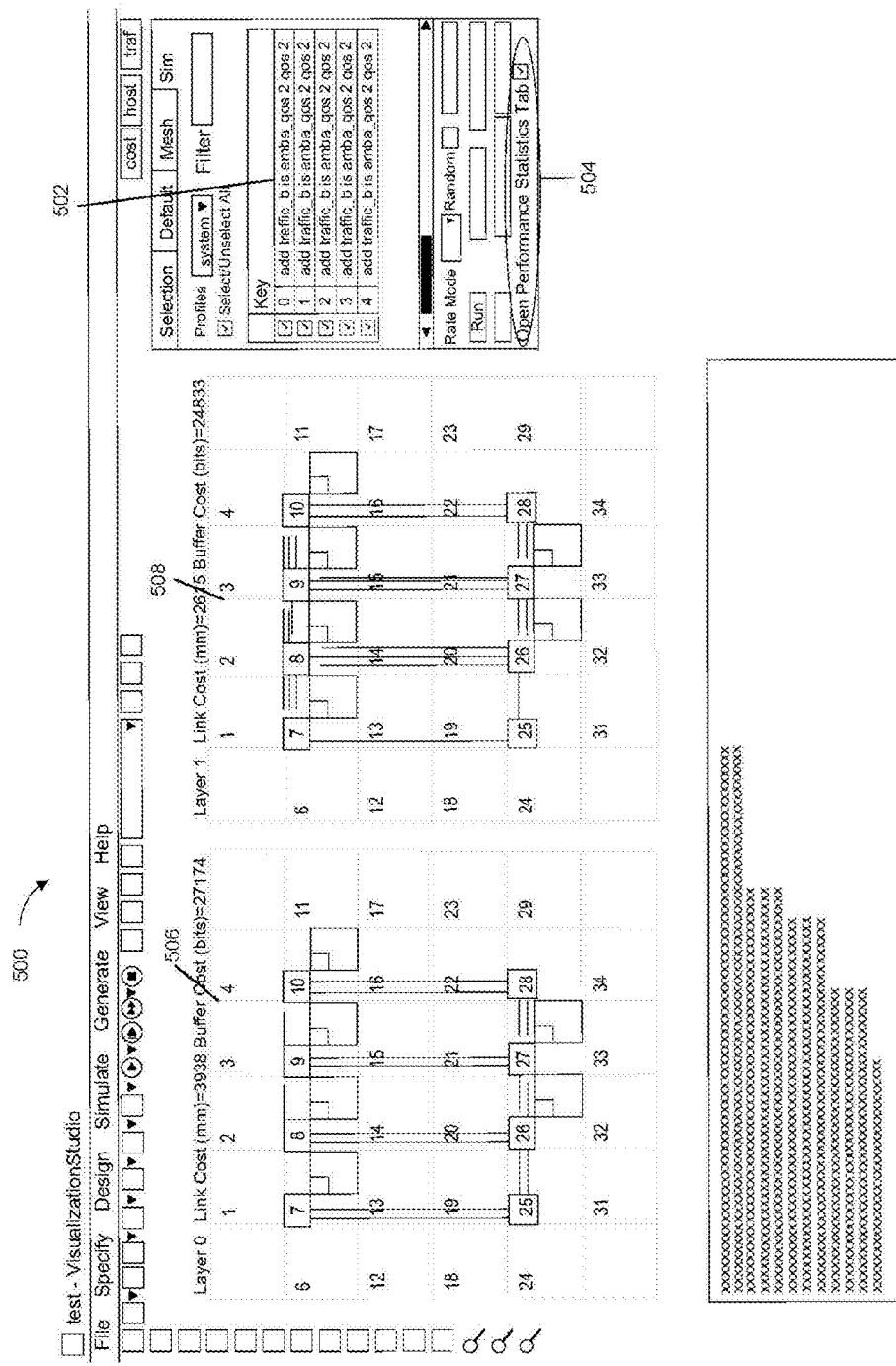
FIGS. 5(a) to 5(f) illustrate example simulation results presentation options/graphs in accordance with an example implementation.

FIG. 5(a) illustrates an example representation 500 showing simulation for a defined number of transactions selected at 502, wherein upon simulation, open performance statistics tab can be selected to view the simulation output in one or more configured graphical format. Button 504 facilitates the visualization of the transactions being simulated in a graphical format, wherein 506 illustrates the transactions selected in layer 0, and 508 illustrates the transactions selected in layer 1.

Figure 5B:
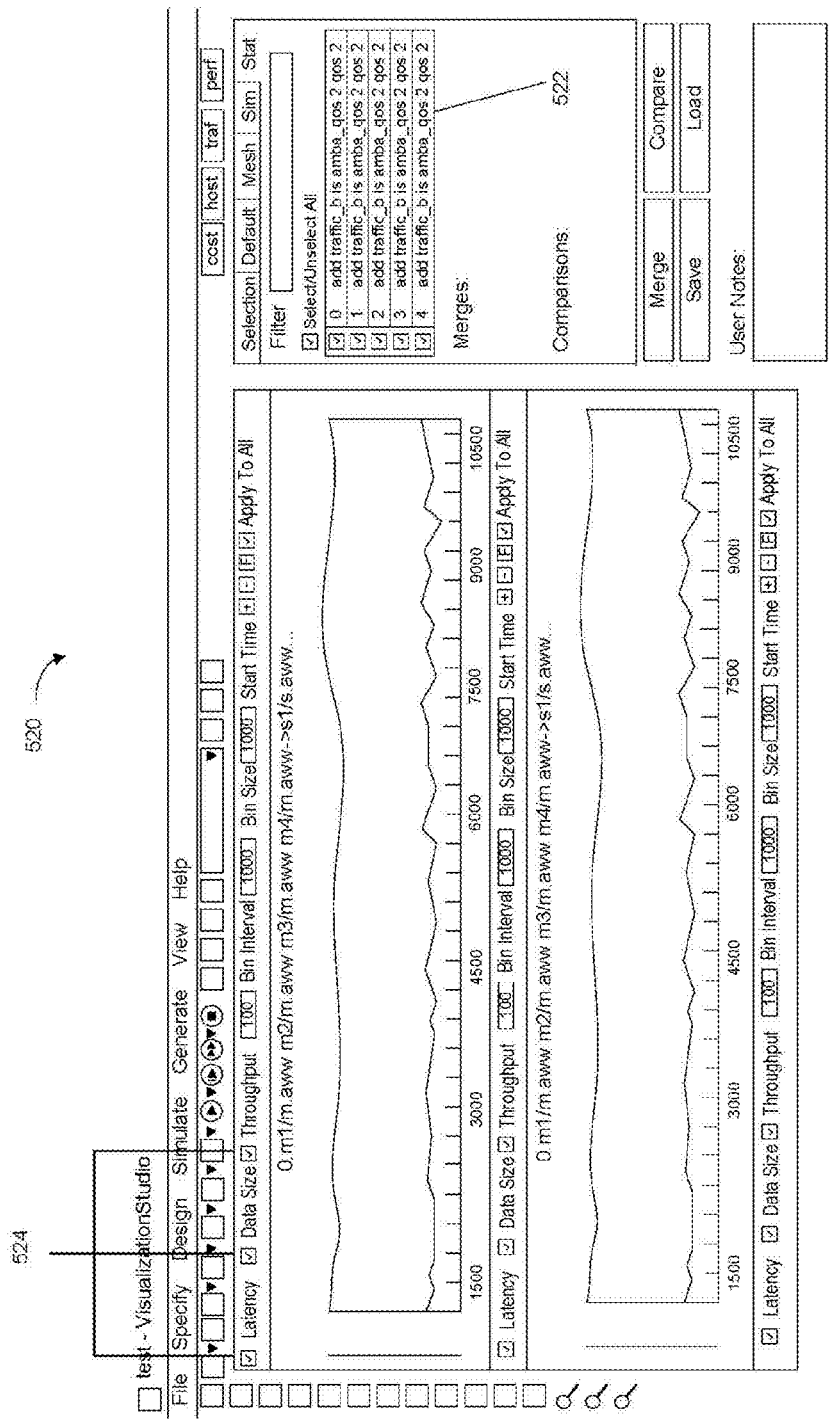

FIG. 5(b) illustrates an example graph 520 showing simulation results for a defined number of five transactions shown in 522, wherein the representation 520 currently shows the graph for transactions 0 and 1, and can be dragged down to view the graphs for the remaining transactions 2-4. As can be seen, both the transactions are being presented with respect to three performance parameters namely, latency, data size, and throughput, shown at 524, wherein any of these parameters can be selected/de-selected or even other new parameters can be added from a pre-defined list or a newly defined parameter. The representation for each graph can further be controlled with respect to options such as bin size and bin interval.

Figure 5C:
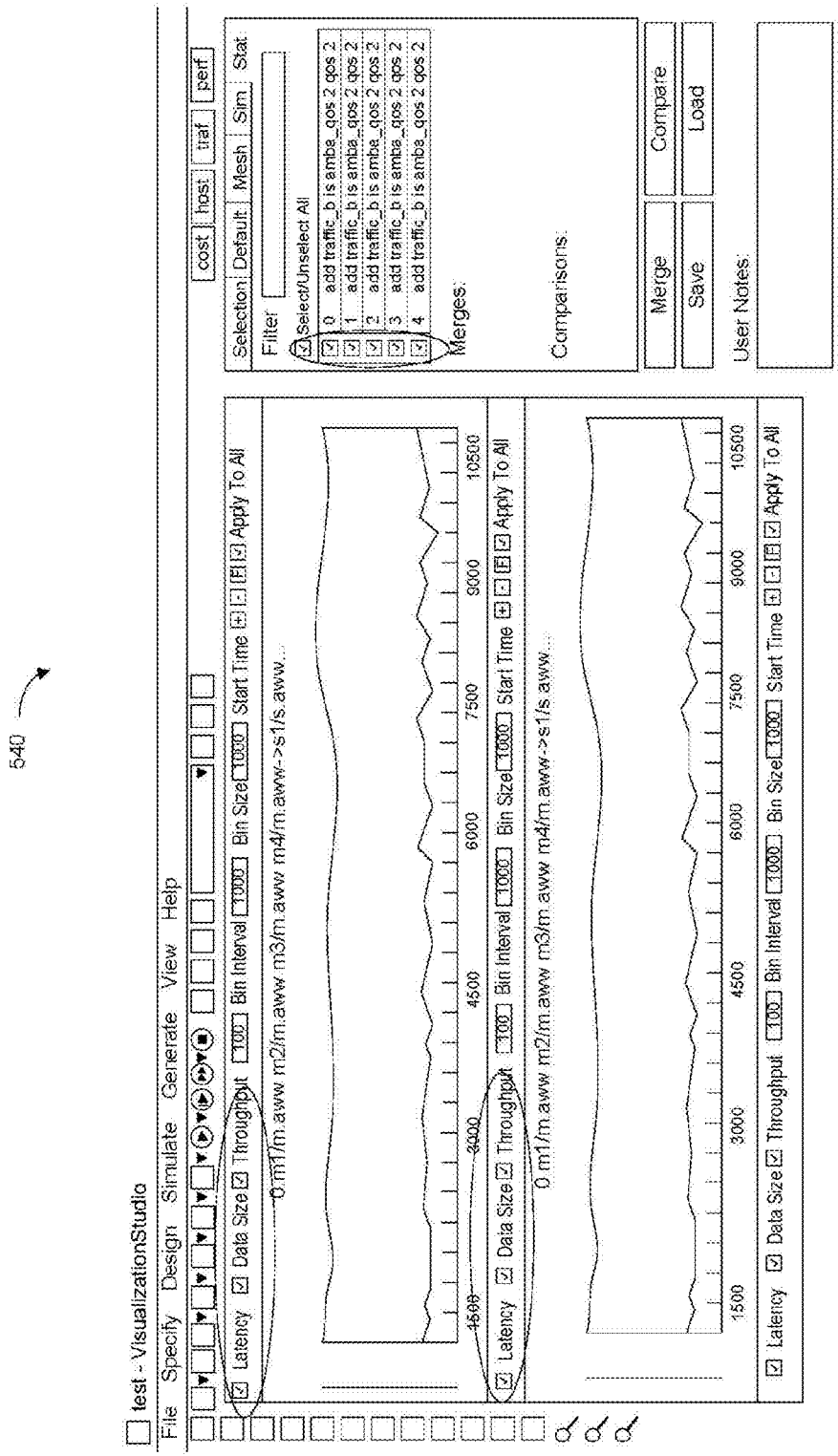

FIG. 5(c) illustrates a similar example representation 540 showing only transactions 1 and 3 being selected and others not being selected for the instant simulation run. The representation 540 further shows latency being the only parameter selected for transaction 1, whereas data size and throughput can be selected as performance parameters for transaction 3. If desired, the graphs can also be zoomed into or specific time interval can be selected for a more comprehensive viewing.

Figure 5D:
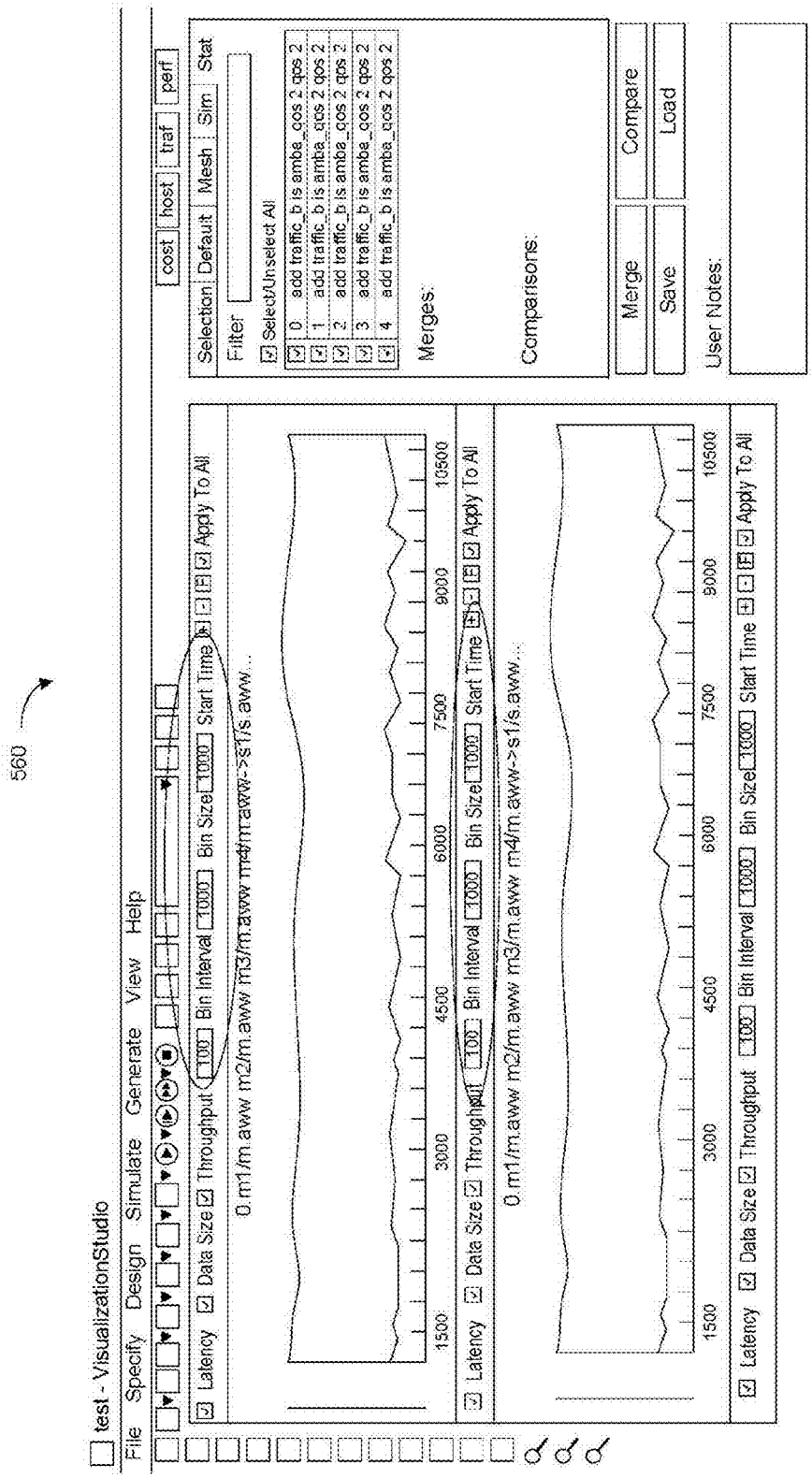

FIG. 5(d) illustrates a similar example representation 560 showing only transactions 1 and 3 being selected with changes being made to bin interval, bin size, and start time, wherein, as can be seen, the start time for transaction 1 is 1000, whereas the start time for transaction 3 is 2000.

Figure 5E:
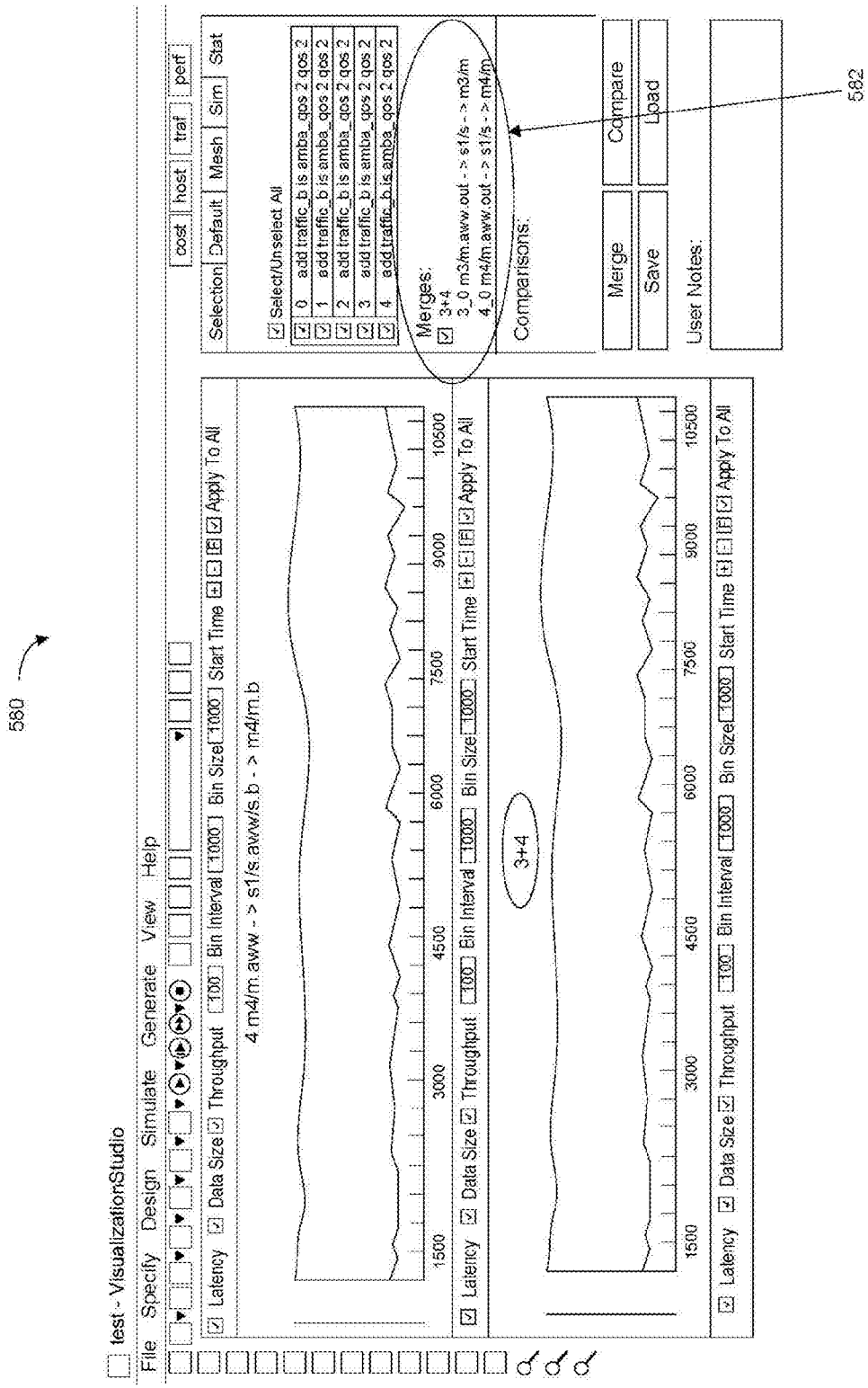
Figure 5F:
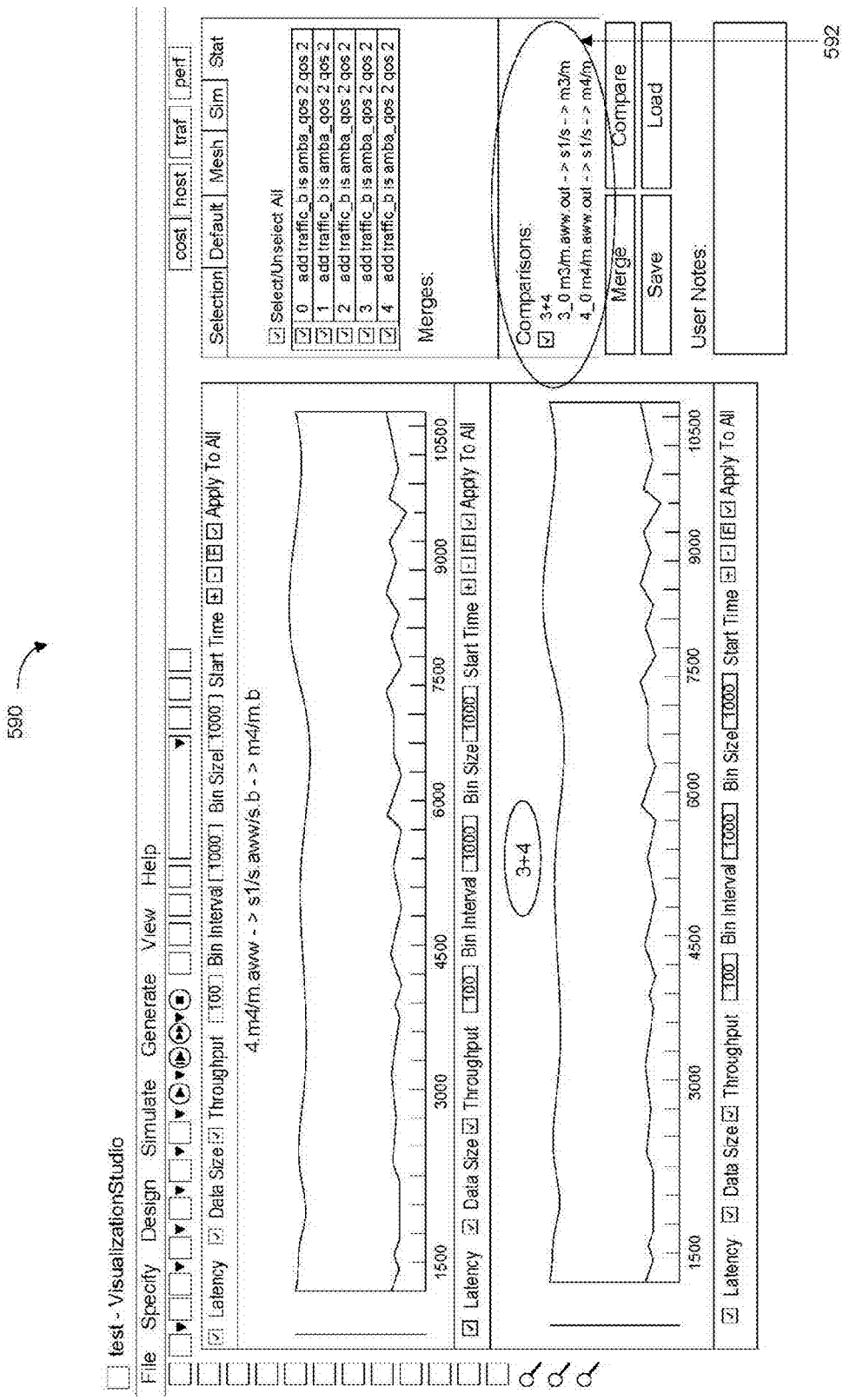

FIG. 5(e) illustrates a similar example representation 580 showing merging of transactions 3 and 4 as shown in 582, enabling a presentation having the merged view of transactions 3 and 4. FIG. 5(f), on the other hand, illustrates a similar representation 590 showing comparison of transactions 3 and 4 as shown in 592, enabling a presentation having a view presenting comparison between transactions 3 and 4.

One can appreciate that these transactions can be selected from live simulations or can be selected from results of previous simulations. Comparisons can also be made with simulation outcome received from previous runs. For instance, for a performance parameter such as throughput, simulation runs conducted for the last ten times on a given transaction can be compared to evaluate the throughput performance trend for the transaction. Variations in performance attributes of the transactions can also be done for each simulation run in order to assess the impact of the variations on the performance attribute.

In an example implementation, visualization/simulation can be used to generate trace files that can further be used for stimulus and comparing performance of NoC or transactions of NoC with other NoCs or other transactions of NoC. In another implementation, behavioral/register transfer level (RTL) model of agents of NoC can be created using the implementations of the present disclosure. In an example implementation, visualization/simulation can be run for selected NoC agents or for all NoC agents and/or for NoC agents operating in different power domains, time domains, and/or clock domains.

In an example implementation, two and more graphs/visual representations of one or more transactions can be merged to generate a single graphs or visual representation. For such a representation, two and more previously stored/generated graphs can be selected and merged to display a single comprehensive graph. For example, two graphs representing throughout over time of two different transactions or sets/sub-sets of transactions can be selected to merge and generate a new merged graph/visual representation that may represent average throughput of both merged transaction or sets/subsets of transactions over time. In an example implementation, two or more data sets received from different sources can be merged to generate a single graph/visual representation.

In an example implementation, two and more graphs/visual representations can be compared from the same simulation or previous simulations by overlapping one graph over the other, or by presenting the two graphs side by side.

FIG. 6 illustrates an example flow diagram 600 used by the method in accordance with an example implementation of the present disclosure. As shown in FIG. 6, at 602, one or more transactions or sub-sets of transactions/messages of NoC/SoC can be selected from a list of possible/available transactions, on which simulation is to be performed for visualization and/or performance characterization. At 604, one or more performance attributes/parameters that need to be monitored/assessed for the selected set of transactions on which the simulation would be performed, can be identified. At 606, simulation can be performed based on the selected set of transactions and the identified performance attributes/parameters. At 608, simulation results can be presented to the user in a desired manner based on the configured representation metrics, wherein at 610, the presentation can be modified through use of one or more visualization parameters such as bin size/interval and simulation time interval.

The following disclosure may incorporate subject matter for performance characterization and visualization, as described, for example in U.S. application Ser. No. 14/477,764, herein incorporated by reference in its entirety for all purposes.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Figure 7:
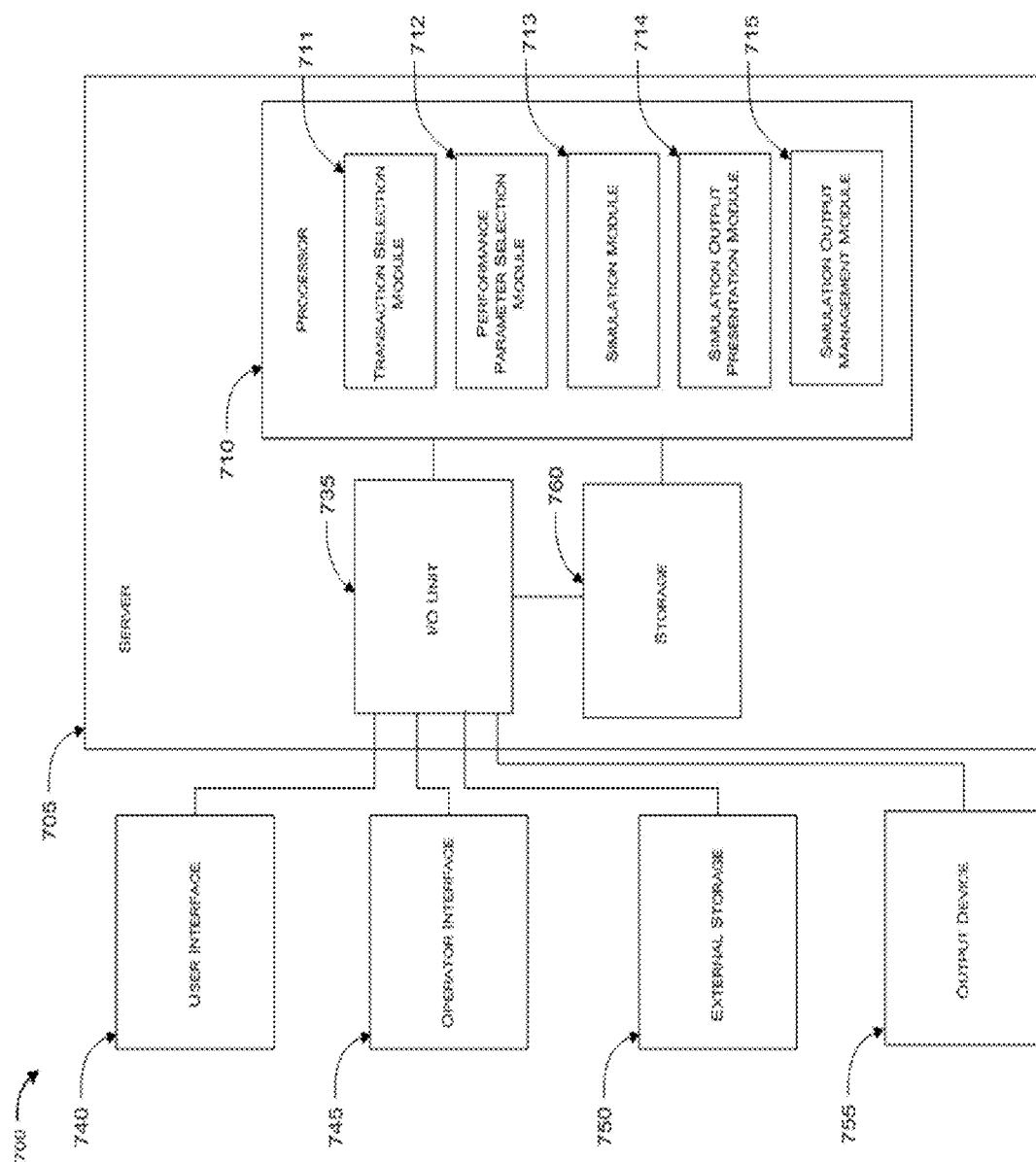
FIG. 7 illustrates a computer/server block diagram upon which the example implementations described herein may be implemented.

FIG. 7 illustrates an example computer system 700 on which example implementations may be implemented. The computer system 700 includes a server 705, which may involve an I/O unit 735, storage 760, and a processor 710 operable to execute one or more units as known to one of skill in the art. The term "computer-readable medium" as used herein refers to any medium that participates in providing instructions to processor 710 for execution, and which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 740 and operator interfaces 745 which may utilize input devices such as a keyboard, mouse, touch device, or verbal or voice command.

The server 705 may also be connected to an external storage 750, which can contain removable storage such as a portable hard drive, optical media (CD or DVD), disk media or any other medium from which a computer can read executable code. The server may also be connected to an output device 755, such as a display to output data and other information to a user, as well as request additional information from a user. The connections from the server 705 to the user interface 740, the operator interface 745, the external storage 750, and the output device 755 may be via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules. System 700 can include a transaction selection module 711, a performance parameter selection module 712, a simulation module 713, and a simulation output presentation module 714. The transaction selection module 711 can be configured to enable selection of one or more transactions or parts/messages thereof (from a list of available transactions) on which the simulation is to be performed. The performance parameter selection module 712 can be configured to enable selection of one or more performance parameters such as throughput, latency, data size, bin size, bin interval, among others, with respect to which the performance simulation would be conducted. The simulation module 713 can be configured to enable the simulation to be performed based on the selected transactions and performance parameters, wherein the simulation output presentation module can enable presentation of the simulation results/output in real-time or after completion of simulation. Simulation output management module 714, on the other hand, can be configured to enable one or more users to change the visual presentation layout of the simulation results by, for example, combining, merging, comparing, along with performing other allied actions such as zoom/resize/change of bin interval/size, on the simulation outcome/simulation output data/results.

In some example implementations, the computer system 700 can be implemented in a computing environment such as a cloud. Such a computing environment can include the computer system 700 being implemented as or communicatively connected to one or more other devices by a network and also connected to one or more storage devices. Such devices can include movable user equipment (UE) (e.g., smartphones, devices integrated with/embedded in vehicles and other machines, devices carried by/integrated with/embedded in humans and animals, and the like), mobile devices (e.g., tablets, notebooks, laptops, personal computers, portable televisions, radios, and the like), and fixed devices designed for stationary use (e.g., desktop computers, other computers, information kiosks, televisions with one or more processors embedded therein and/or coupled thereto, radios, and the like).

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method, comprising:
conducting a simulation of one or more transactions of a Network on Chip (NoC) system through a simulation device;
during or after the simulation of the one or more transactions of the NoC system;
presenting a visual display of simulation results on a display, the visual display indicative of performance of the NoC system, for at least one of: one or more subsets of the one or more transactions, one or more messages of the transactions of the NoC, at least a subset of source interfaces of the NoC and at least a subset of destination interfaces of the NoC, one or more NoC agents, and one or more NoC channels;
wherein the visual display is indicative of performance of the NoC comprises at least one of latency, throughput, and data size of the NoC over time; and
displaying a list of the at least one of the one or more transactions, one or more messages of the NoC, at least a subset of source interfaces of the NoC and at least a subset of destination interfaces of the NoC, one or more NoC agents, and one or more NoC channels with the visual display of simulation results and adjusting the visual display based on a selection within the list.

2. The method of claim 1, further comprising adjusting the visual display of simulation results based on at least one of bin size, bin interval, and a simulation time interval, wherein the bin size is indicative of a time period for aggregating the simulation results, and wherein the bin interval is indicative of the time interval between consecutive aggregated simulation results.

3. The method of claim 2, further comprising providing an expansion of an aggregated simulation result in another visual display in response to a selection of the aggregated simulation result in the visual display.

4. The method of claim 1, further comprising merging the visual display of simulation results with another visual display of simulation results from one of the previously executed simulations and the simulation to generate a merged visual display of simulation results.

5. The method of claim 1, further comprising displaying the visual display of simulation results with another visual display of simulation results from one of the previously executed simulations and the simulation as a side by side comparison, or in an overlapping manner.

6. The method of claim 5, wherein the previously executed simulation is a simulation of one of: the NoC system with different parameters and a different NoC system.

7. The method of claim 1, wherein the visual display of simulation results is presented as one of a histogram, a table, and a graph plot.

8. The method of claim 1, wherein the visual display indicative of performance of the NoC is indicative of at least one of: latency, throughput, packet size, data size, latency breakdown, load of one or more channels, states of one or more elements of the NoC system, and transaction data.

9. The method of claim 1, wherein the visual display of simulation results further comprises a display of a target metric.

10. The method of claim 1, further comprising filtering simulation results based on an input associated with a specified rule, and adjusting the visual display of simulation results based on the filtered simulation results.

11. The method of claim 1, further comprising providing another visual display indicative of simulation results for a region selected within the visual display.

12. A non-transitory computer readable medium storing instructions for executing a process, the instructions comprising:
conducting a simulation of one or more transactions of a Network on Chip (NoC) system;
during or after the simulation of the one or more transactions of the NoC system, present a visual display of simulation results, the visual display indicative of performance of the NoC system, for at least one of: one or more subsets of the one or more transactions, one or more messages of the transactions of the NoC, at least a subset of source interfaces of the NoC and at least a subset of destination interfaces of the NoC, one or more NoC agents, and one or more NoC channels;
wherein the visual display is indicative of performance of the NoC comprises at least one of latency, throughput, and data size of the NoC over time; and
displaying a list of the at least one of the one or more transactions, one or more messages of the NoC, at least a subset of source interfaces of the NoC and at least a subset of destination interfaces of the NoC, one or more NoC agents, and one or more NoC channels with the visual display of simulation results and adjusting the visual display based on a selection within the list.

13. The non-transitory computer readable medium of claim 12, wherein the instructions further comprise adjusting the visual display of simulation results based on at least one of bin size, bin interval, and a simulation time interval, wherein the bin size is indicative of a time period for aggregating the simulation results, and wherein the bin interval is indicative of the time interval between consecutive aggregated simulation results.

14. The non-transitory computer readable medium of claim 13, wherein the instructions further comprise providing an expansion of an aggregated simulation result in another visual display in response to a selection of the aggregated simulation result in the visual display.

15. The non-transitory computer readable medium of claim 12, wherein the instructions further comprise merging the visual display of simulation results with another visual display of simulation results from one of the previously executed simulations and the simulation to generate a merged visual display of simulation results.

16. The non-transitory computer readable medium of claim 12, wherein the instructions further comprise displaying the visual display of simulation results with another visual display of simulation results from one of the previously executed simulations and the simulation as a side by side comparison, or in an overlapping manner.

17. The non-transitory computer readable medium of claim 16, wherein the previously executed simulation is a simulation of one of: the NoC system with different parameters and a different NoC system.

* * * * *